(12) United States Patent
Johnson

(10) Patent No.: US 6,325,355 B1
(45) Date of Patent: Dec. 4, 2001

(54) SPRING HANDLE ANGLE COCK

(75) Inventor: Tom E. Johnson, Watertown, NY (US)

(73) Assignee: New York Air Brake Corporation, Watertown, NY (US)

( * ) Notice: Subject to any disclaimer, the term of this patent is extended or adjusted under 35 U.S.C. 154(b) by 0 days.

(21) Appl. No.: 09/546,388

(22) Filed: Apr. 10, 2000

(51) Int. Cl.$^7$ ................................................ F16K 35/00
(52) U.S. Cl. ............................ 251/99; 251/243; 251/288
(58) Field of Search ............................. 257/99, 243, 288

(56) References Cited

U.S. PATENT DOCUMENTS

| | | |
|---|---|---|
| 538,317 | 4/1895 | Boynton . |
| 596,871 * | 1/1898 | Grist ..................................... 251/288 |
| 859,839 * | 7/1907 | Price ..................................... 251/99 |
| 952,121 | 3/1910 | Koehler . |
| 952,743 | 3/1910 | Jenkins . |
| 979,344 | 12/1910 | Shallow . |
| 1,035,490 | 8/1912 | Stott et al. . |
| 1,509,816 | 9/1924 | Kendrick . |
| 1,583,142 | 5/1926 | Hanrahan . |
| 2,065,750 | 12/1936 | Safford . |
| 2,147,287 | 2/1939 | Farmer . |
| 2,855,154 | 10/1958 | Tyler et al. . |
| 3,019,811 | 2/1962 | Young et al. . |
| 3,184,212 | 5/1965 | Billeter . |
| 3,448,961 * | 6/1969 | Enssle ................................... 251/288 |
| 3,779,513 * | 12/1973 | Levine ............................... 251/288 X |
| 4,099,543 | 7/1978 | Mong et al. . |
| 4,125,128 | 11/1978 | Elward et al. . |
| 4,456,219 | 6/1984 | Scott et al. . |
| 4,548,237 | 10/1985 | Bogenschutz . |
| 4,909,275 | 3/1990 | Massey et al. . |
| 5,072,913 | 12/1991 | Carroll et al. . |
| 5,887,850 * | 3/1999 | Ruffalo ............................... 251/99 X |

* cited by examiner

Primary Examiner—Kevin Shaver
Assistant Examiner—John Bastianelli
(74) Attorney, Agent, or Firm—Barnes & Thornburg

(57) ABSTRACT

A handle mechanism to be mounted to a stem of a valve element. The mechanism includes a socket to be fixed to the stem of the valve element, a handle portion including a clevis having a pair of legs and a base joining the legs and pivotally connected to the socket at a lug of the socket and a generally C-shaped spring. The spring has a first end and a second end. The spring engages the lug surface and the top surface of the base over a substantial portion of the spring. A method of installing the spring, including hooking a lip at a first end of the spring over a back surface of the base of the clevis, pivoting a second end of the spring down onto the lug surface and snapping the second end of the spring on a bottom portion of the lug surface.

13 Claims, 4 Drawing Sheets

SPRING HANDLE ANGLE COCK

BACKGROUND AND SUMMARY OF THE INVENTION

The present invention relates generally to handles for valves and angle cocks and more specifically to an improved locking handle for valve and angle cocks employed in air brake systems of railway trains.

Angle cocks or valves are provided throughout the air brake system of railroad trains to interconnect the cars. The open or closed condition of the valve is important to the operation of the air brakes of a train. While the last angle cock on the last car must be closed, all other angle cocks throughout the train must remain open for effective operation of the air brakes. Presently, cars using the regime of the American Association of Railroads ("AAR"), use a two-piece angle cock handle wherein one piece is mounted to the shaft of the actuator of the valve and a second piece pivots relative thereto to lock and unlock the handle and the position of the valve. Stops provided on the cover of the valve engaged with the handle to limit the degree of opening and closing of the handle and valve as well as to lock the valve in a specific condition. A spring or gravity returns the handle to its lowered position. Typical examples are illustrated in FIGS. 1, 2 and 3 to be discussed in detail below.

The present invention is a handle to be mounted to a stem of a valve and includes a) a socket to be fixed to the stem of the valve element, b) a handle including a clevis having a pair of legs and a base joining the legs and pivotally connected to the socket at a lug of the socket and c) a generally C-shaped spring. The spring extends from a first end engaging the base over a top surface of the base of the clevis and the lug surface to a second end engaging a bottom portion of the lug surface. The spring engages the lug surface and the top surface of the base over a substantial portion of the spring when the handle is in the lowered locked position. The handle includes side walls extending from the base of the clevis and forming a recess with the base. The first end of the spring extends through the recess. The first end includes a lip extending down along a back surface of the base. The spring is flat laterally and deformed longitudinally to conform to the lug surface and the top surface of the base over a substantial portion of the spring.

A method of installing the spring on the valve handle includes hooking a lip at the first end of the C-shaped spring over the back surface of the base of the clevis; pivoting the second end of the spring down onto the lug surface; and snapping the second end on the bottom portion of the lug surface. The second end is snapped on the bottom portion by applying pressure to a center portion of the spring.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
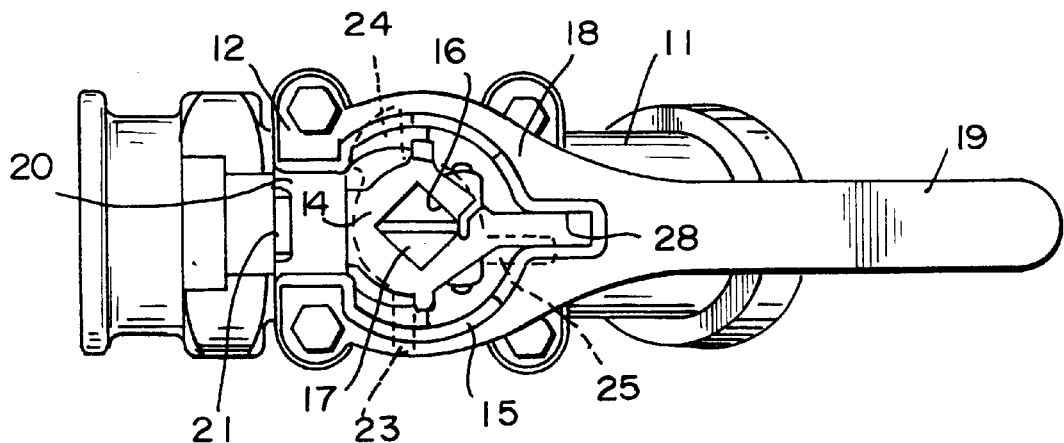
FIG. 1 is a plan view of a valve with a two-piece handle for a valve of the prior art.
Figure 2:
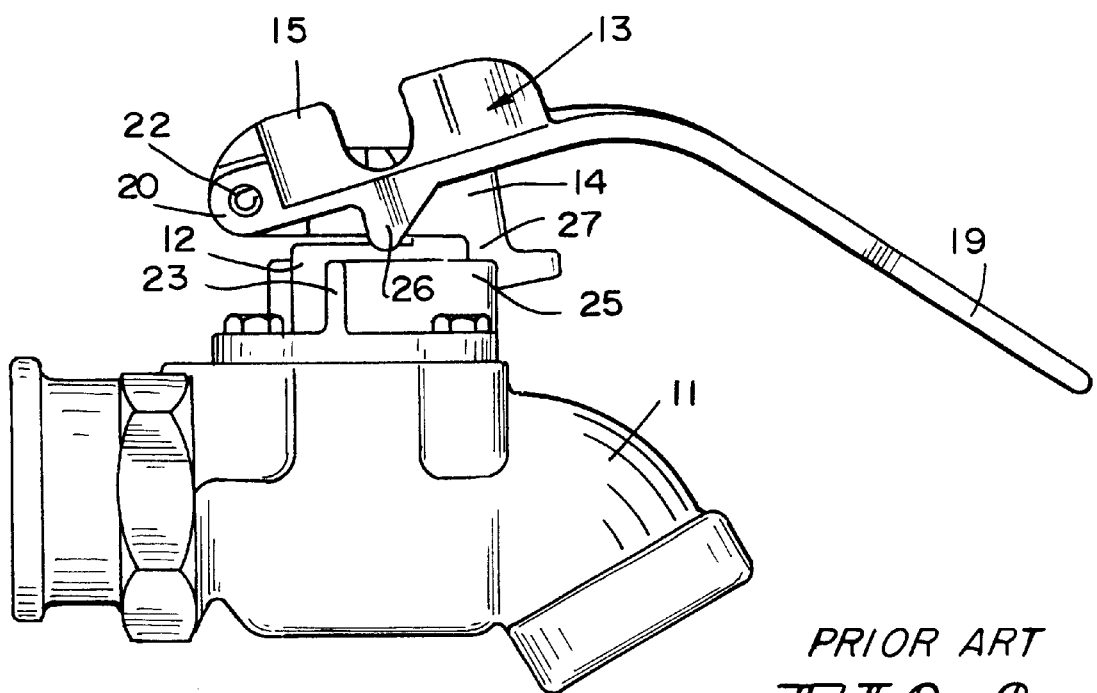
FIG. 2 is a side view of the prior art valve of FIG. 1.

A two-piece handle for an angle cock or other such valve of the prior art is illustrated in FIGS. 1 and 2. A valve body 11 includes a cover 12 and a locking handle mechanism 13 which selects and locks the open and closed position of the valve. The handle mechanism 13 includes a socket portion 14 and a handle portion 15. An opening 16 in the socket portion 14 receives operating stem 17 of the valve member within the valve body 11. Fastener 18 through the socket portion 14 clamps the socket portion on the stem 17.

Figure 3:
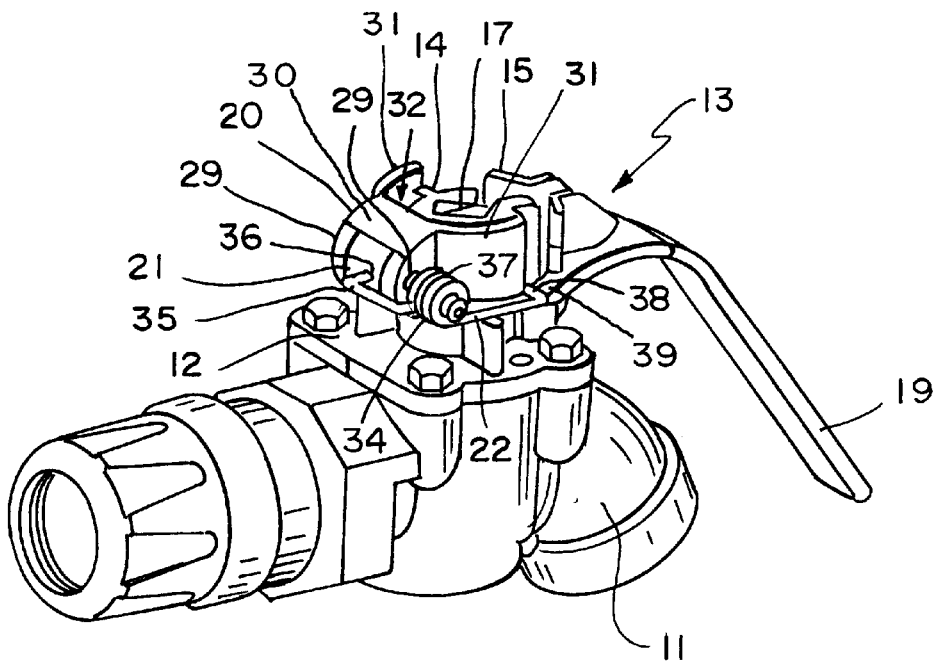
FIG. 3 is a perspective view of a spring handle for a valve of the prior art.

The handle portion 15 includes a handle lever 19 extending from one end and a bifurcated boss or clevis 20 at the other end. A lug 21 of the socket portion 14 is between legs 29 extending from base 30 of the clevis 20 and is pivotally connected thereto by a pin 22 (FIG. 3). The cover 12 includes a pair of opposed bosses 23 and 24 and a boss 25 therebetween as seen in FIG. 1. Lugs 26 on each side of the handle portion 15 engage the stops 23 and 24 in the position illustrated in FIG. 1 to lock the handle in one angular position and when raised as shown in FIG. 2 and rotated 90° degrees counter-clockwise in FIG. 1 and subsequently lower, will engage stop 25.

A tang 27 projects from the side of the socket portion 14 and rotates between stops 24 and 25. Tang 27 is not raised or lowered by the pivotal movement of the handle 19 as are lugs 26 and therefore delimits the movement of the handle. Tang 27 is also received in slot 28 of the handle 19 when the handle mechanism 13 is in its down position. The two-piece handle structure of FIGS. 1 and 2 stays in its down position by gravity.

A spring biased locking handle mechanism of the prior art is illustrated in FIG. 3. Spring 34 includes a first end 35 received in a hole 36 in the lug 21 of the handle mechanism 13. It then continues to a center portion 37 which is coiled about an extended pin 22. It then terminates at a second end 38 lying on surface 39 of the handle portion 15. This provides a biasing force against the handle portion 15 at 39 down in addition to gravity. This spring requires modification of the handle by drilling the hole 36 in the lug 21 as well as dismantling to replace the pin 22 with a longer pin. Although the handle mechanism may originally be made this way, it is not as convenient to retrofit the handle mechanisms in the field.

Figure 5:
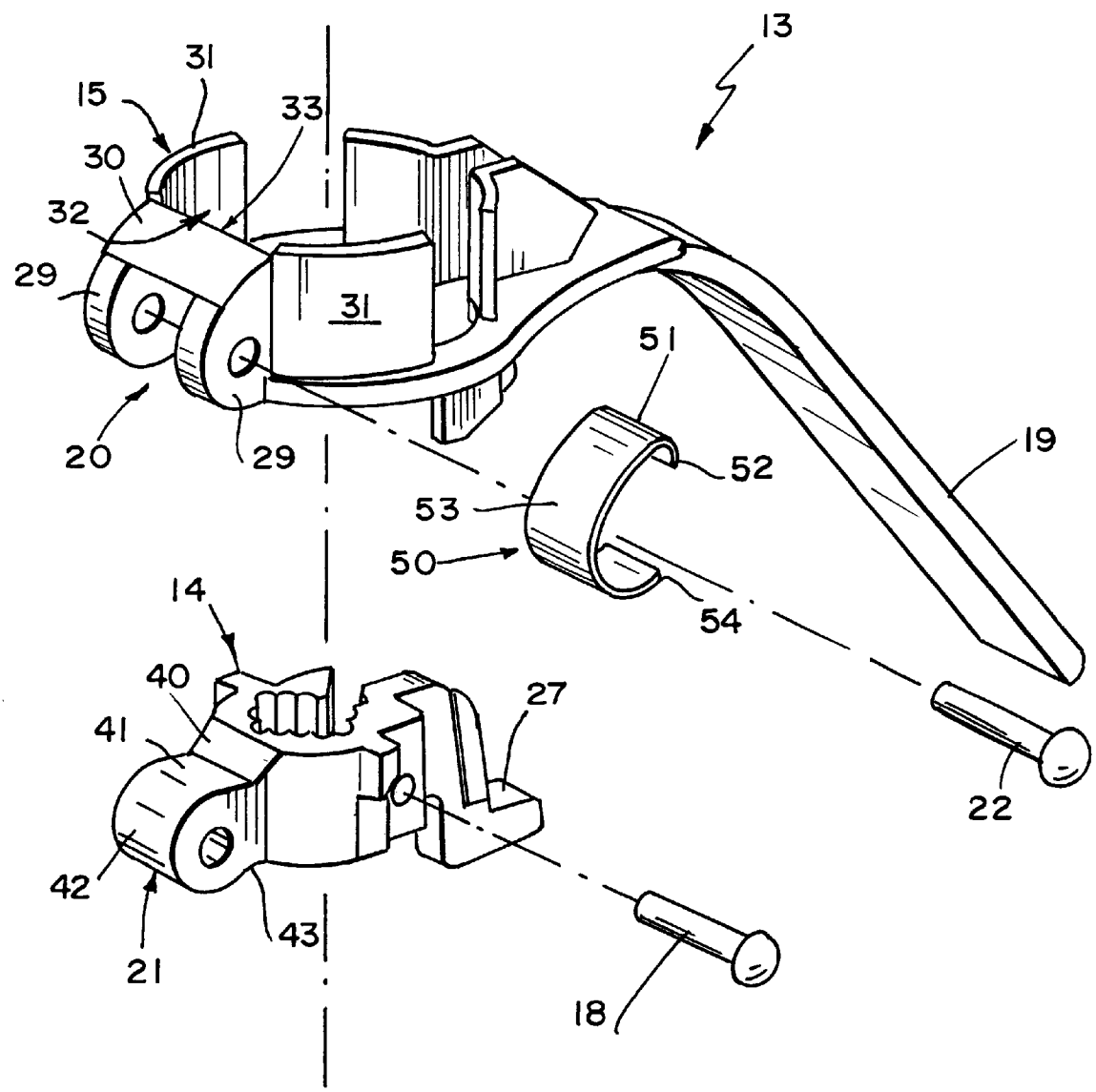
FIG. 5 is an exploded view of a spring handle incorporating the principles of the present invention.

As noted in FIG. 5, the base 30 of the clevis 20 is joined to and terminates below sidewalls 31 of the handle mechanism 13 to form recess 32 therebetween. The base 30 also includes a back surface 33.

Figure 4:
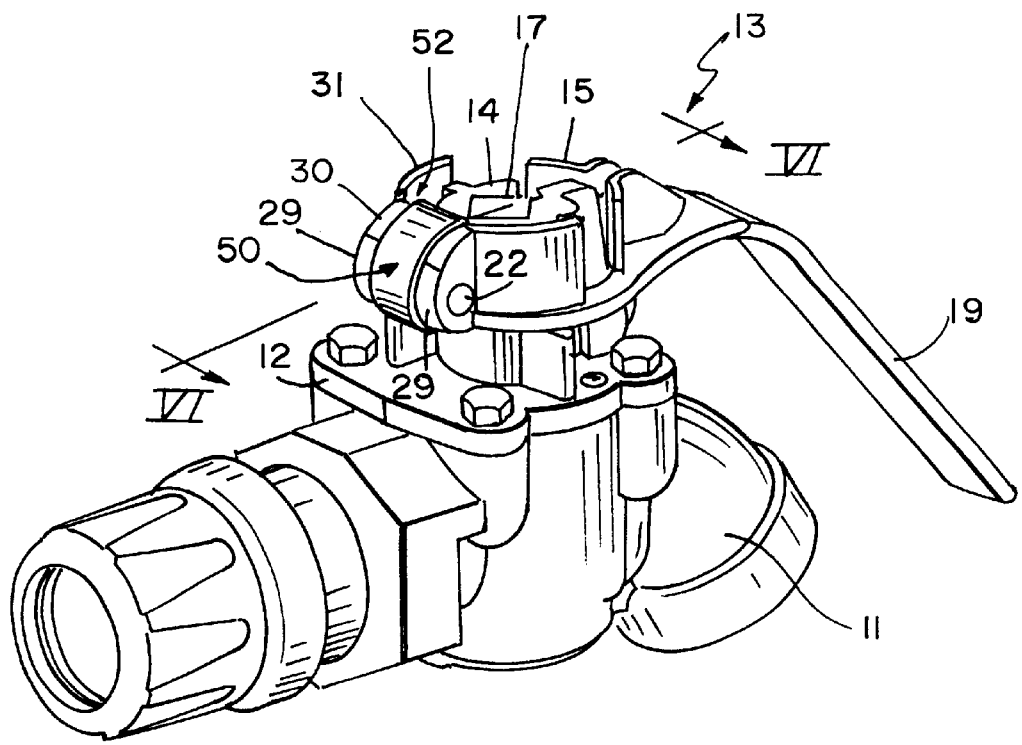
FIG. 4 is a perspective view of a valve with a spring handle incorporating the principles of the present invention.
Figure 6:
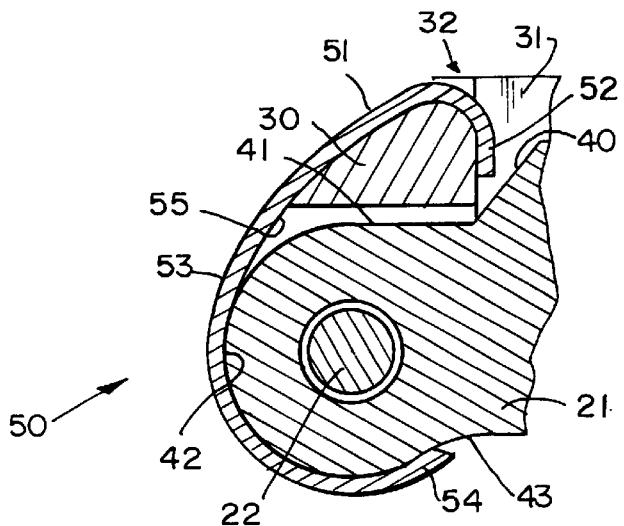
FIG. 6 is a cross-sectional view taken along the lines VI—VI of FIG. 4 with the handle in a lowered locked position.
Figure 7:
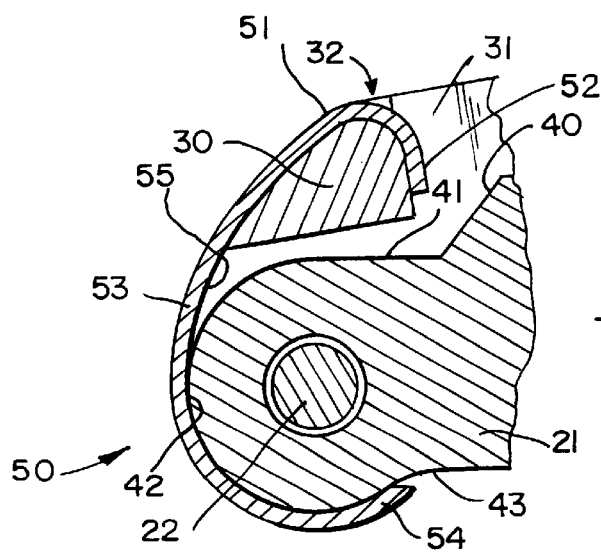
FIG. 7 is a cross-sectional view with the handle in a raised unlocked position.

A spring mechanism which can be applied to the handle without any special tools is illustrated in FIGS. 4–8. It is a generally C-shaped spring 50 having a first end 51 with a lip 52 extending therefrom. A center section 53 connects the first end 51 to a second end 54. The first end 51 extends through the recess 32 with the lip 52 engaging the back surface of base 30. As illustrated in FIG. 4 and 6, the spring 50 is shaped so as to extend over the exterior surface of base 30 of the clevis 20, over the exterior surface of the lug 21 and terminating adjacent the bottom surface of the lug 21. The shape of the spring 50 is such that interior surface 55 substantially engages surfaces of the base 30 and lug 21 in the closed position of the handle as illustrated in FIG. 6. Preferably, the spring 50 is made out of sheet metal.

The lug 21 includes an incline surface 40 connected to a top flat 41, followed by a generally curved or radius portion 42, and terminating at a bottom flat portion 43.

Figure 8:
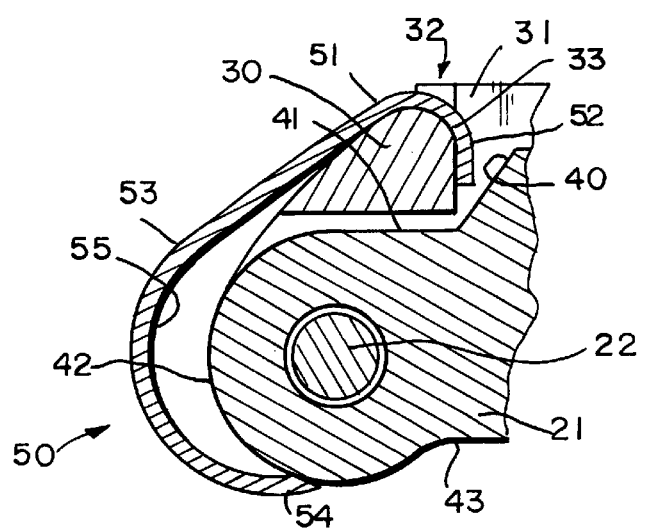
FIG. 8 is a cross-sectional view of a method of installation of a spring on the handle incorporating the principles of the present invention.

The method of installation of spring 50 on the handle mechanism 13 is illustrated in FIG. 8 by positioning the first end 51 of the spring 50 in the recess 32 with the leg 52 extending down along the back surface 33 of the base 30. The second end 54 of the spring 50 engages the curved center portion 42 of the lug 21. Pressure applied to the center section 53 forces the second end 54 past the curved center portion 42 to be adjacent and/or engage the flat portion 43 of the boss 21 as shown in FIG. 6.

When the handle mechanism 13 is raised to an unlocked position, the center portion 53 of the spring 50 flexes while end 51 is retained in the recess 32 and the second end 54 continues to engage the bottom flat 43 of the lug. Upon release of the handle, the spring 50 force, as well as gravity, causes the handle portion 15 to lower back into the position as illustrated in FIG. 6.

By positioning the first end 51 with lip 52 in the recess 32, the spring 50 will not be dislodged from the handle mechanism 13 as the handle mechanism 13 is rotated between the open and closed position of the valve.

The spring is shaped such that the 30° of pivot of the handle portion 15 about the pin 22 can occur. The resiliency of the spring 50 is such that approximately five pounds of force is required to lift the handle portion 15 from the position in FIG. 6. Thus, it can be seen that the spring 50 is relatively inexpensive, is capable of being maintained in place and does not require any modification of existing valve handles to be installed.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A valve including a body, a valve element in the body having an open and closed position, and a handle connected to a stem of the valve element and cooperating with the body to lock the valve element in the open and closed positions, the handle comprising:
   a socket fixed to the stem of the valve element and including a lug having a curved surface between side faces;
   a handle including a clevis pivotally connected to the socket at the lug and having a raised unlocked position and a lowered locked position, the clevis having a pair of legs and a base joining the legs at one end of the legs; and
   a spring having a generally C-shape extending from a first end engaging the base over a top surface of the base of the clevis and the lug surface to a second end engaging a bottom portion of the lug surface, the spring engaging the lug surface and the top surface of the base over a substantial portion of the spring when the handle is in the lowered locked position.

2. The valve according to claim 1, wherein the handle includes side walls extending from the base of the clevis and forming a recess with the base; and the first end of the spring extends through the recess.

3. The valve according to claim 2, wherein the first end includes a lip extending down along a back surface of the base.

4. The valve according to claim 1 wherein the first end includes a lip extending down along a back surface of the base.

5. The valve according to claim 1, wherein the spring is a sheet deformed to conform to the lug surface and the top surface of the base over a substantial al portion of the spring.

6. A handle to be mounted to a stem of a valve, the handle comprising:
   a socket to be fixed to the stem of the valve element and including a lug having a curved surface between side faces;
   a handle including a clevis pivotally connected to the socket at the lug and having a raised unlocked position and a lowered locked position, the clevis having a pair of legs and a base joining the legs at one end of the legs; and
   a spring having a generally C-shape extending from a first end engaging the base over a top surface of the base of the clevis and the lug surface to a second end engaging a bottom portion of the lug surface, the spring engaging the lug surface and the top surface of the base over a substantial portion of the spring when the handle is in the lowered locked position.

7. The handle according to claim 6, wherein the handle includes side walls extending from the base of the clevis and forming a recess with the base; and the second end of the spring extends through the recess.

8. The handle according to claim 7, wherein the first end includes a lip extending down along a back surface of the base.

9. The handle according to claim 6, wherein the first end includes a lip extending down along a back surface of the base.

10. The handle according to claim 6, wherein the spring is a flat laterally and deformed longitudinally to conform to the lug surface and the top surface of the base over a substantial portion of the spring.

11. A method of installing a spring on a valve handle, the valve handle including a) a socket to be fixed to the stem of the valve element and including a lug having a curved surface between side faces, and b) a handle including a clevis pivotally connected to the socket at the lug and having a pair of legs and a base joining the legs at one end of the legs, the method including:
   hooking a lip at a first end of a C-shaped spring over a back surface of the base of the clevis;
   pivoting a second end of the spring down onto the lug surface; and
   snapping the second end on a bottom portion of the lug surface.

12. The method according to claim 11, wherein the second end is snapped on the bottom portion by applying pressure to a center portion of the spring.

13. The method according to claim 11, wherein the handle includes side walls extending from the base of the clevis and forming a recess with the base; and the first end of the spring is positioned to extend through the recess.

* * * * *